(12) United States Patent
Kikirov et al.

(10) Patent No.: US 11,869,049 B2
(45) Date of Patent: Jan. 9, 2024

(54) SYSTEM AND METHOD FOR CONNECTING HAIR AND BEAUTY SERVICES CONSUMERS TO INDIVIDUAL SERVICE PROVIDERS VIA MOBILE PLATFORMS

(71) Applicants: Roman Kikirov, Aurora, CO (US); Semion Kikirov, Aurora, CO (US)

(72) Inventors: Roman Kikirov, Aurora, CO (US); Semion Kikirov, Aurora, CO (US)

( * ) Notice: Subject to any disclaimer, the term of this patent is extended or adjusted under 35 U.S.C. 154(b) by 0 days.

(21) Appl. No.: 17/500,776

(22) Filed: Oct. 13, 2021

(65) Prior Publication Data

US 2022/0114629 A1 Apr. 14, 2022

Related U.S. Application Data

(60) Provisional application No. 63/091,221, filed on Oct. 13, 2020.

(51) Int. Cl.
*G06Q 30/02* (2023.01)
*G06Q 30/06* (2023.01)
*G06Q 30/0282* (2023.01)
*G06Q 30/0601* (2023.01)

(52) U.S. Cl.
CPC ..... *G06Q 30/0282* (2013.01); *G06Q 30/0601* (2013.01)

(58) Field of Classification Search
None
See application file for complete search history.

(56) References Cited

U.S. PATENT DOCUMENTS 10,600,105 B1 * 3/2020 Kumar ............... G06Q 30/0637
10,817,591 B2 * 10/2020 Minina ................ G06F 16/252
2014/0351092 A1 * 11/2014 Burkhart ............ G06Q 30/0625 705/26.62
2015/0339697 A1 * 11/2015 Park ........................ H04W 4/02 715/748
2016/0247112 A1 * 8/2016 Carter, III .......... G06Q 10/1095
2016/0267403 A1 * 9/2016 Hoffart ................. H04W 4/024
2018/0101894 A1 * 4/2018 Markoff ............. G06Q 30/0639
2019/0258780 A1 * 8/2019 Minina ................ G06Q 30/018
2020/0151673 A1 * 5/2020 Palko ................... G06F 16/9535
2021/0019711 A1 * 1/2021 Romero ............. G06Q 10/1095
2021/0089972 A1 * 3/2021 Gaines ................... G06Q 10/02

OTHER PUBLICATIONS

Anon., "Registration Opens for 'nailhub'," Wirelss News, Close-Up Media, Inc. (Jul. 9, 2014). (Year: 2014).*
Jeshi, K., "Beauty at your doorstep," The Hindu [Chennai], Jul. 11, 2016. (Year: 2016).*

* cited by examiner

*Primary Examiner* — Nicholas D Rosen
(74) *Attorney, Agent, or Firm* — Dickinson Wright PLLC (57) ABSTRACT

A system and method for connecting hair and beauty consumers directly with individual service providers, and more particularly to an automated system and method for allowing consumers and individual service providers to directly interact via a plurality of online mobile platforms. The system comprises a mobile computing device configured to receive user input data from a user at the mobile computing device, receive third-party data from individual service providers at the mobile computing device, and create a list of available individual services providers that meet a set of selected requirements of a user at the mobile computing device, wherein the list of available services is based at least in part on the user input data and the third-party data.

10 Claims, 5 Drawing Sheets

SYSTEM AND METHOD FOR CONNECTING HAIR AND BEAUTY SERVICES CONSUMERS TO INDIVIDUAL SERVICE PROVIDERS VIA MOBILE PLATFORMS

CROSS-REFERENCES TO RELATED APPLICATIONS

This application claims the benefit of and priority from U.S. provisional application No. 63/091,221 filed on Oct. 13, 2020. The contents of the above application are hereby incorporated herein by reference in full.

TECHNICAL FIELD

The present disclosure relates to a system and method for connecting hair and beauty consumers directly with individual service providers, and more particularly to an automated system and method for allowing consumers and individual service providers to directly interact via a plurality of online mobile platforms.

BACKGROUND

There has been a demonstrated widespread need for a better process to connect individual service providers directly to consumers, or visa-versa, in the hair and beauty industry. Currently, there are no systems and methods in the hair and beauty industry that allow consumers to select a specific individual service provider based upon a number of filters that may be important to the consumer, such as, for example, price, location, availability, ratings, etc. The systems and methods currently known in the art only allow a consumer to select a service provider, i.e. a barber shop, based upon the reviews the barber shop has been given by consumers online. The user cannot, however, select an individual service provider, i.e. an individual stylist, based upon his or her reviews because those individual reviews do not currently exist online, or if they do, they are not comprehensive. Consequently, a user may be able to select a service provider that has overall good reviews, but cannot be guaranteed that the individual stylist that the user will be paired with is also of the same quality. The present invention solves these problems by removing the middle man (business) and connecting the user directly to the individual service providers via a plurality of mobile platforms. The present invention creates a search query for clients based on ratings, location and other filters. The present invention thus creates a system and method in which the consumer is provided more freedom, confidence and consistency in the service that he or she is seeking. The present invention also allows the individual service providers to create their own brand, schedule, service times, service prices, and location. The present invention thus increases the customer service level as the service provider will received a direct rating from the customer.

SUMMARY OF THE INVENTION

Accordingly, one object of the present disclosure is to provide an information capturing and processing system, comprising a mobile computing device for hair and beauty services configured to receive user input data from a user at the mobile computing device, receive third-party data from individual service providers at the mobile computing device, and create a list of available individual services providers that meet a set of selected requirements of a user at the mobile computing device, wherein the list of available services is based at least in part on the user input data and the third-party data. In this preferred embodiment, a user then selects a plan of service at the mobile computing device, wherein the selected plan of service is chosen from the list of available services providers that meet the set of selected requirements of a user. The plan of service is then transmitted to the selected individual service provider via a communication link, and the plan of service is executed by a user at the mobile computing device by engaging directly with the selected individual service provider. In this preferred embodiment, the user is then asked to provide a review of the plan of service to the selected individual service provider at the mobile computing device, wherein the user can provide the selected service provider with feedback related to the plan of service, provide a summary of the plan of service by the selected service provider after the service [[have]] has been performed at the mobile computing device. The summary of the plan of service is then transmitted by the selected service provider to a server via a communication link, wherein the summary of the plan of service can be accessed by the user and the selected service provider during future services.

The Summary is neither intended nor should it be construed as being representative of the full extent and scope of the present disclosure. The present disclosure is set forth in various levels of detail in the Summary, as well as in the attached drawings and the Detailed Description, and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. Further details and other features will become apparent after review of the following Detailed Description and accompanying drawing figures.

The present invention provides its benefits across a broad spectrum of endeavors. It is applicant's intent that this specification and the claims appended hereto be accorded a breadth in keeping with the scope and spirit of the invention being disclosed despite what might appear to be limiting language imposed by the requirements of referring to the specific examples disclosed. Thus, to acquaint persons skilled in the pertinent arts most closely related to the present invention, a preferred embodiment of the system is disclosed for the purpose of illustrating the nature of the invention. The exemplary method of installing, assembling and operating the system is described in detail according to the preferred embodiment, without attempting to describe all of the various forms and modifications in which the invention might be embodied. As such, the embodiments described herein are illustrative, and as will become apparent to those skilled in the art, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, subparagraph (f).

DETAILED DESCRIPTION

Figure 1:
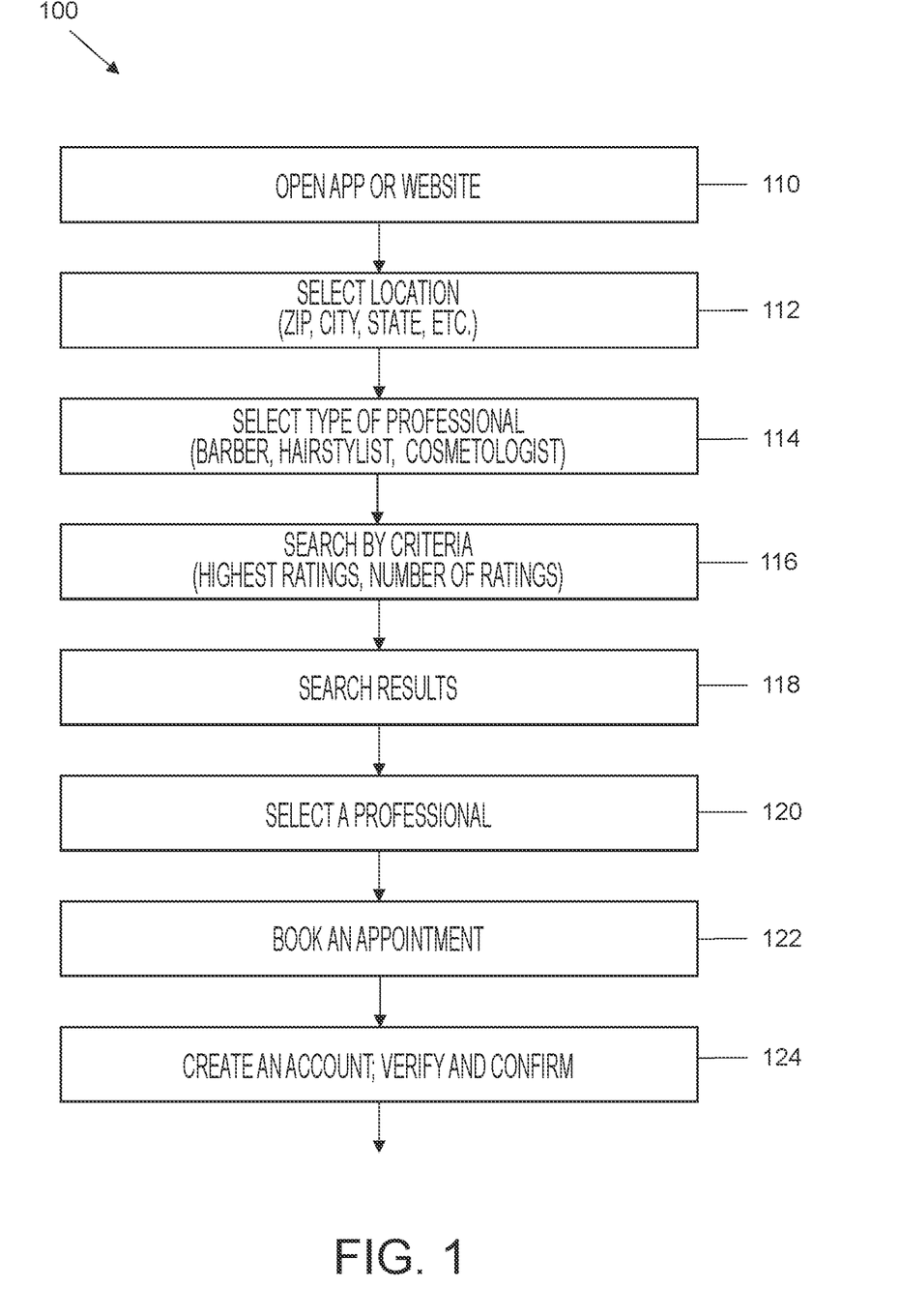
FIG. 1 is a schematic of an embodiment of the present invention.

The present invention discloses an information capturing and processing system, comprising a mobile computing device for hair and beauty services configured to receive user input data from a user at the mobile computing device via opening an app or a website (110, FIG. 1), receive third-party data from individual service providers at the mobile computing device, and create a list of available individual services providers that meet a set of selected requirements of a user at the mobile computing device (118, FIG. 1), wherein the list of available services is based at least in part on the user input data and the third-party data (112, 114 and 116, FIG. 1). In this preferred embodiment, a user then selects a plan of service at the mobile computing device (120, FIG. 1), wherein the selected plan of service is chosen from the list of available services providers that meet the set of selected requirements of a user. The plan of service is then transmitted to the selected individual service provider via a communication link, and the plan of service is executed by a user at the mobile computing device by engaging directly with the selected individual service provider. In this preferred embodiment, the user is then asked to provide a review of the plan of service to the selected individual service provider at the mobile computing device, wherein the user can provide the selected service provider with feedback related to the plan of service, provide a summary of the plan of service by the selected service provider after the service [[have]] h_a been performed at the mobile computing device. The summary of the plan of service is then transmitted by the selected service provider to a server via a communication link, wherein the summary of the plan of service can be accessed by the user and the selected service provider during future services.

In these preferred embodiments, a search can be performed by a user for the type of health and beauty services that the user is seeking, such as, for example, haircare, nails or makeup (114, FIG. 1). The user then selects categories and/or filters that break-down further options such as location, zip-code, price range, popular individual stylists, individuals offering a deal, hot & new, open now, good for kids, amenities and ambiance, free wi-fi, wheelchair accessible, gender neutral restrooms, distance from user (i.e. any distance, 0.3 miles, 1 miles, 5 miles, 20 miles), payment method, military discounts, price, hours of operation (116, FIG. 1).

In some preferred embodiments, the client can either click on the website of the service provider and book on that website or call to book. The service provider can also use the POS system of the present invention to allow potential clients to book. In some preferred embodiments, the service providers can create their own service names, prices, time windows, schedules, and they can control how long in the future the books are open. In some embodiments, the client can book more than one service at the same time via the mobile application of the present invention (122, FIG. 1). In these embodiments, the client may create an account and may confirm the date, time, and service (124, FIG. 1). Then the client will receive a confirmation email or text message (202, FIG. 2). The client will also receive another reminder 24 hours prior to the appointment (204, FIG. 2). The service provider can make scheduling policy and fees associated with no shows. The client can cancel or reschedule and the service provider will receive the notifications.

Figure 2:
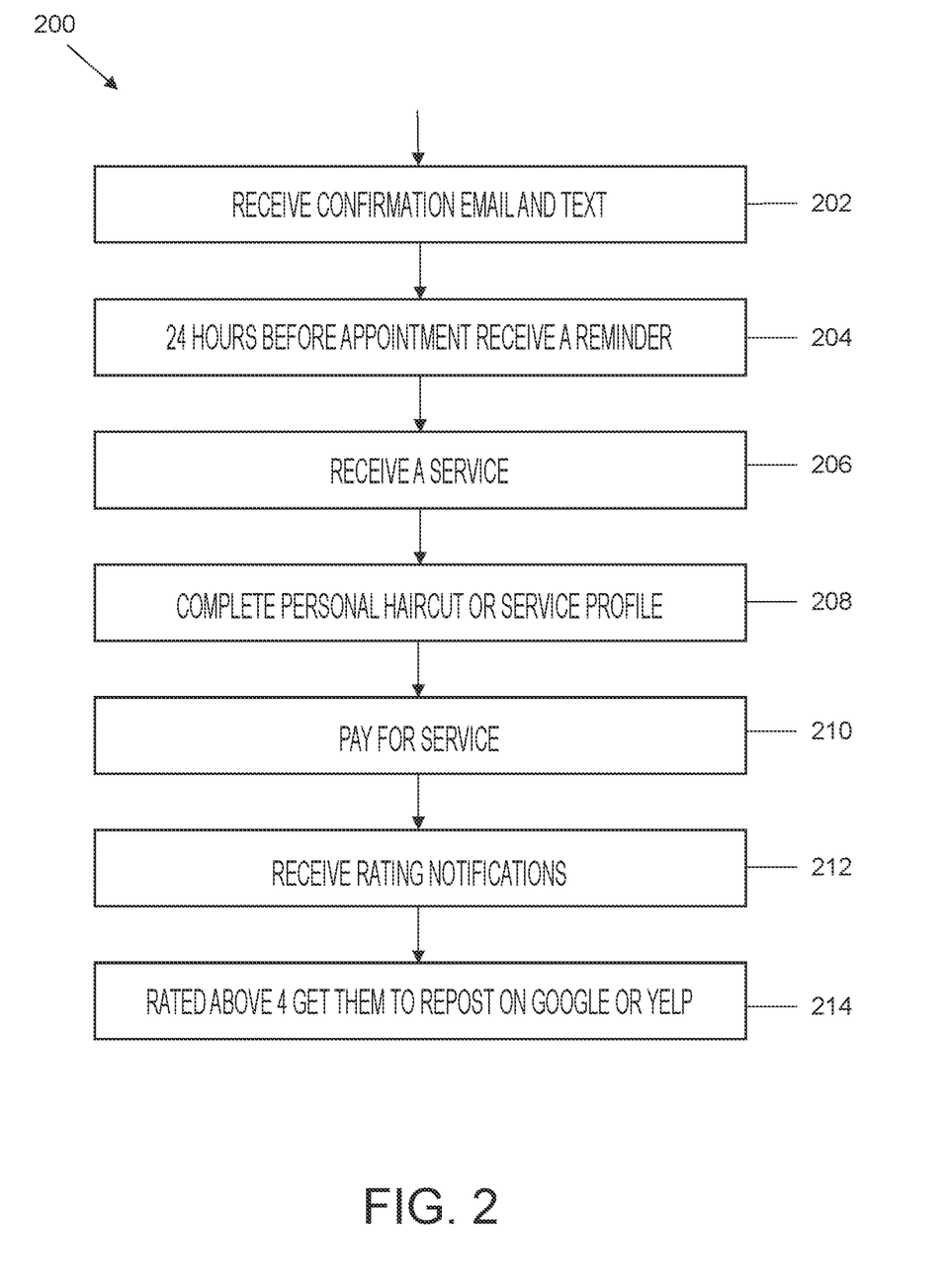
FIG. 2 is a continuation of FIG. 1.

In some preferred embodiments, after the service, clients can create their own personal haircut profile (208, FIG. 2). Information such as picture, type of the haircut, numbers used on the side and length left on the top can be added by the client or the individual service provider. That information will be stored for future access with both the client and the individual service provider.

After the service, the client and individual service provider can decide on the payment arrangement (cash, credit, etc.) (210, FIG. 2). The service provider can also use its own POS system to process the payment both service and tip. In some embodiments, clients can also pay for products from an individual service provider online via a plurality of mobile applications.

In some preferred embodiments, the client will receive a survey to rate the service received after the services have been completed (212, FIG. 2). In some embodiments, the client will receive a survey with five questions. If the rating is above 4 out of 5 then there will be a prompt to pre-book the next appointment, and may be reposted on social media platforms such as Google and Yelp (214, FIG. 2). If the rating is below 3 out of 5, then the service provider will receive a notification to correct the situation.

The service provider will receive notification when the client completes the survey/ratings. In some embodiments, a service provider can respond to the survey. Individual service providers can refund the money if they chose to do so. Ratings can be flagged, in certain situations. In some preferred embodiments, only verified purchasers can submit a survey/complete ratings of individual service providers. Unlike, other mobile platforms currently known in the art, the present invention will not allow reviews to be submitted from un-verified users and will only allow actual clients to submit reviews of an individual service provider.

Figure 3:
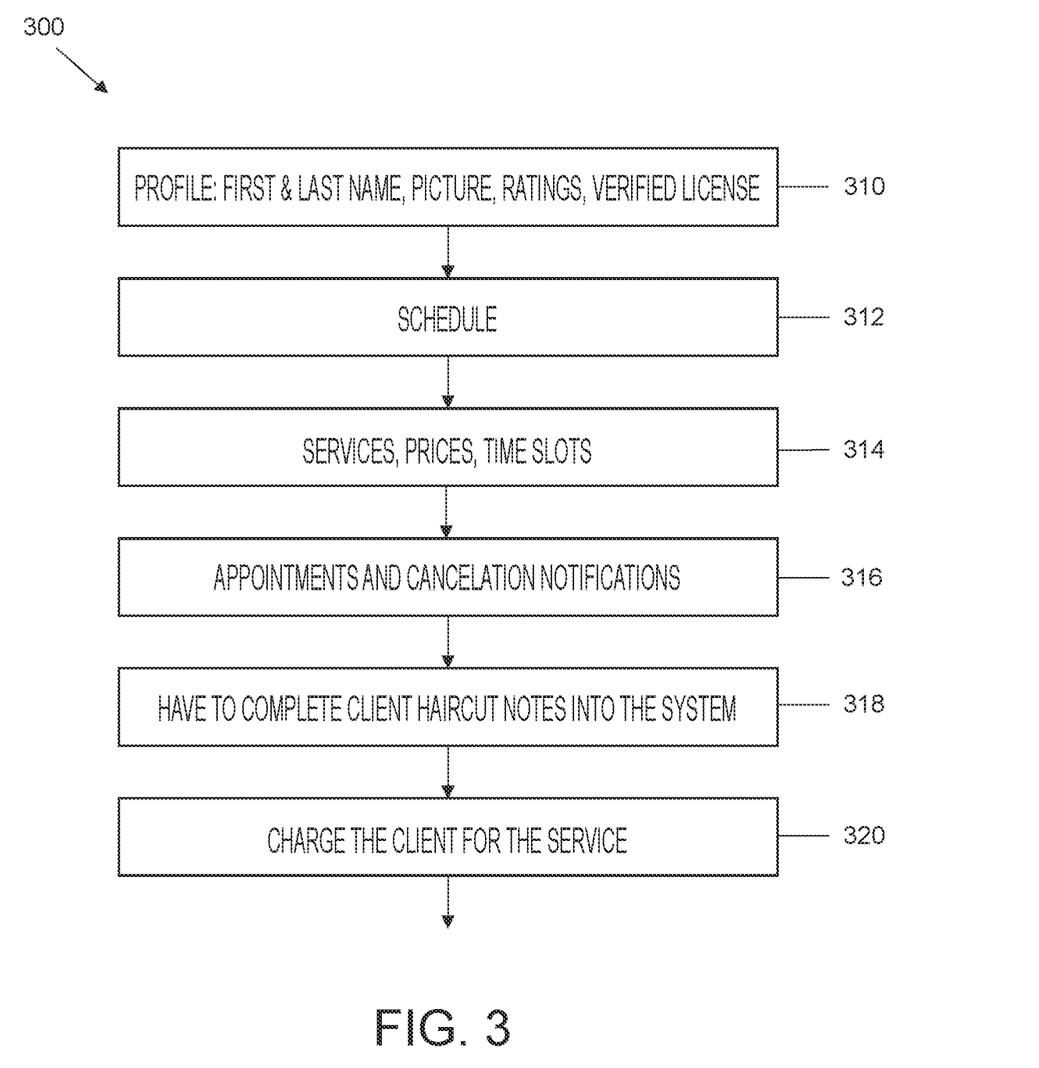
FIG. 3 is another schematic of an embodiment of the present invention.

In some preferred embodiments, an individual service provider can create a profile page on a mobile application, which includes the individual services providers' first and last name, license picture (verified license for extra fee), professional work pictures, website, phone number/contact information, address, ratings, price range and other information corresponding to filters that clients/potential clients can select (310, FIG. 3).

Figure 4:
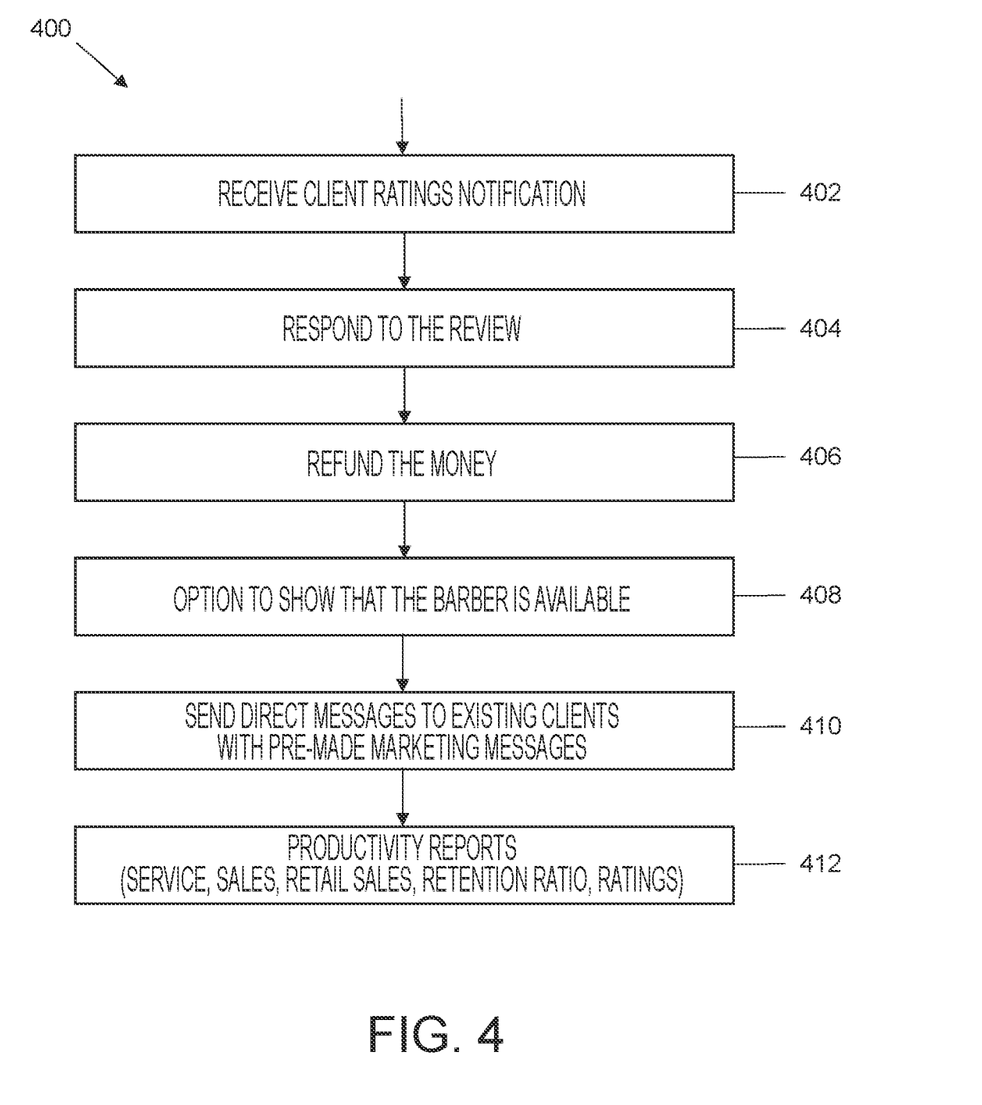
FIG. 4 is a continuation of FIG. 3.
Figure 5:
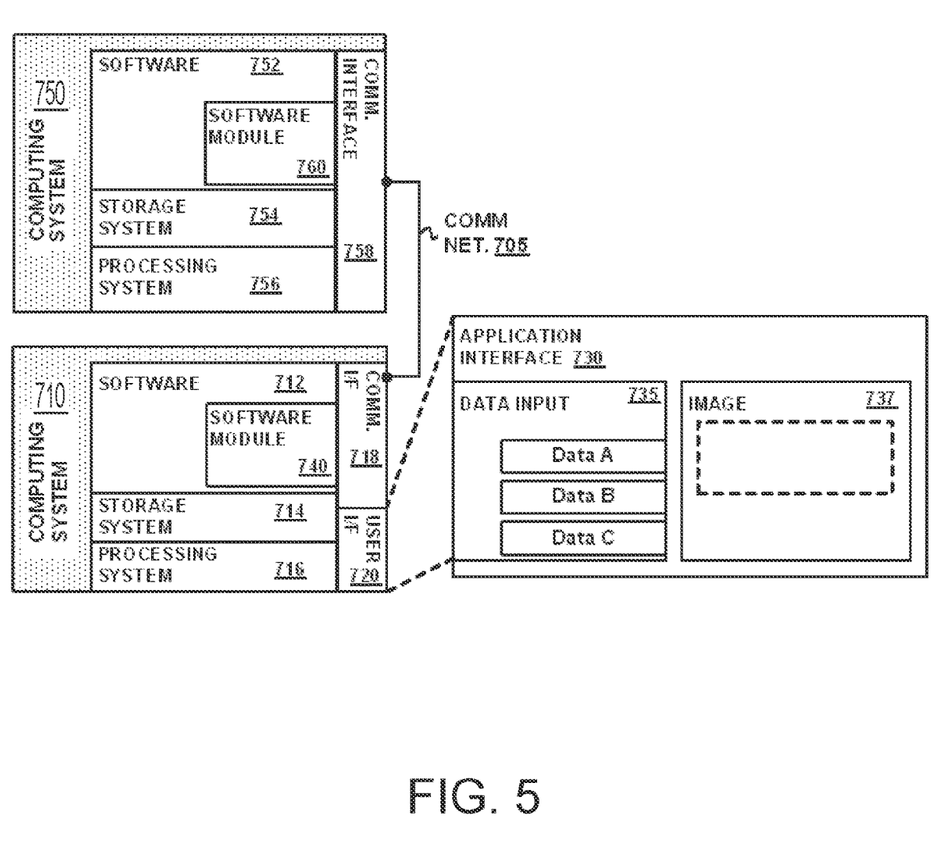
FIG. 5 is another schematic of an embodiment of the present invention.

In some embodiments, if the service provider choses the option to use the booking system of the present invention, then he or she can create their own schedule, time slots, service names, service prices, and service time (312 and 314, FIG. 3). In these embodiments, there will be a "book now" icon. Individual service providers can open books to the time of their choosing, they can copy and paste old schedules, they can receive notifications when a booking was made or cancelled (316, FIG. 3), and they can turn off or on the notifications. After a service is rendered, the provider will need to complete a note in the booking system, then charge the client for the service rendered (318 and 320, FIG. 3). Once the client enters service review or ratings into the system, the provider will receive notification (402, FIG. 4). The provider may choose to respond to the review or rating, and/or provide refund to the client (404 and 406, FIG. 4). The system also provides the option to show a service provider's availability (408, FIG. 4), send direct messages to existing clients with marketing material (410, FIG. 4), and provide productivity reports that may include services rendered, sales, retail sales, client retention ratio, ratings, etc. (412, FIG. 4).

In some embodiments, the client can also create a personal profile that can be shared with individual service providers, which includes pictures, detailed service information such as, for example, clipper numbers on the side and back, how many inches on the top, tapered, round or squared, etc.

In some preferred embodiments, individual service providers have access to various marketing tools, such as, for example, preferential placement in search results, displaying their page at the top of a search, displaying their page on a competitors page, sending direct messages to current clients, etc.

In some preferred embodiments, individual service providers can rent a booth to perform services for user by hours, days, weeks, months via the present invention. In these embodiments, booth and suites owners can advertise on the app directly to the users.

In some embodiments, shop owners can also use the present invention to allow their individual service providers to build their own clientele, which in turn also generates more business for the shop owner. Shop owners can also use the present invention for hiring purposes, based on, for example, ratings, price, etc. Shop owners can also use the present invention to promote their individual service providers so new clients can come to their shop use their individual service providers.

Generally, it is in the service providers' best interest to make sure the client is happy, and that the client receives the best services available. Thus, the present invention discloses a system and method in which the individual service providers that receive better ratings and feedback from their clients will be more prominently displayed on the search features of the app. Under this system and method the individual service providers will also be more incentivized to remedy a situation if the client is not happy in order to cure a situation that may lead to less than ideal ratings or feedback from a consumer. Thus, the service providers that are not providing the best services will either have to work on becoming better or will have low ratings, which will lead to less business being generated through the app. Under this system and method, clients will have more control as they will know what service providers they are selecting prior to receiving services.

Some embodiments of the present invention also disclose a non-volatile computer readable medium with instructions stored thereon which, if executed by a processor, causes the processor to receive user input data for hair and beauty services from a user at the mobile computing device, receive third-party data for hair and beauty services from individual service providers at the mobile computing device, and create a list of available individual services providers that meet a set of selected requirements of a user at the mobile computing device. In these preferred embodiments, the list of available services is based at least in part on the user input data and the third-party data. The present invention then causes the processor to select a plan of service by a user at the mobile computing device, wherein the selected plan of service is chosen from the list of available services providers that meet the set of selected requirements of a user. The processor then transmits the plan of service to the selected individual service provider via a communication link, executes the plan of service by a user at the mobile computing device by engaging directly with the selected individual service provider, and provides a review of the plan of service to the selected individual service provider by a user at the mobile computing device. The user can provide the selected service provider with feedback related to the plan of service. The processor then provides a summary of the plan of service by the selected service provider after the service has been performed at the mobile computing device, and transmits the summary of the plan of service by the selected service provider to a server via a communication link, wherein the summary of the plan of service can be accessed by the user and the selected service provider during future services.

In these embodiments, as described in FIG. 7, computing system 710 includes processing system 716, storage system 714, software 712, communication interface 718, and user interface 720. Processing system 716 loads and executes software 712 from storage system 714, including software module 740. When executed by computing system 710, software module 740 directs processing system 716 to receive data, images, devices, locations, and/or equipment, etc. Such data could include any of the information described above.

Although computing system 710 includes one software module in the present example, it should be understood that one or more modules could provide the same operation. Similarly, the computing systems may be distributed using other computing systems and software.

Additionally, computing system 710 includes communication interface 718 that can be further configured to transmit the collected data to computing system 750 using communication network 705. Communication network 705 could include the Internet, cellular network, satellite network, RF communication, blue-tooth type communication, near field, or any other form of communication network capable of facilitating communication between computing systems 710 and 750. In some examples, communication interface 718 can further include a global positioning system to determine the location of computing system 710.

Referring still to FIG. 7, processing system 716 can comprise a microprocessor and other circuitry that retrieves and executes software 712 from storage system 714. Processing system 716 can be implemented within a single processing device but can also be distributed across multiple processing devices or sub-systems that cooperate in executing program instructions. Examples of processing system 716 include general purpose central processing units, application specific processors, and logic devices, as well as any other type of processing device, combinations of processing devices, or variations thereof. Storage system 714 can comprise any storage media readable by processing system 716, and capable of storing software 712. Storage system 714 can include volatile and nonvolatile, removable and non-removable media implemented in any method or technology for storage of information, such as computer readable instructions, data structures, program modules, or other data. Storage system 714 can be implemented as a single storage device but may also be implemented across multiple storage devices or sub-systems. Storage system 714 can comprise additional elements, such as a controller, capable of communicating with processing system 716.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal. Although one software module is shown, the software may be distributed across many devices, storage media, etc.

User interface 720 can include a mouse, a keyboard, a camera, image capture, a voice input device, a touch input device for receiving a gesture from a user, a motion input device for detecting non-touch gestures and other motions by a user, and other comparable input devices and associated processing elements capable of receiving user input from a user. These input devices can be used for defining and receiving data about the location, maps, systems, devices, locations, and/or equipment, etc. Output devices such as a graphical display, speakers, printer, haptic devices, and other types of output devices may also be included in user interface 720. The aforementioned user input and output devices are well known in the art and need not be discussed at length here.

Application interface 730 can include data input 735 and image display 737. It should be understood that although computing system 710 is shown as one system, the system can comprise one or more systems to collect data.

Computing system 750 includes processing system 756, storage system 754, software 752, and communication interface 758. Processing system 756 loads and executes software 752 from storage system 754, including software module 760. When executed by computing system 750, software module 760 directs processing system 710 to store and manage the data from computing system 710 and other similar computing systems. Although computing system 710 includes one software module in the present example, it should be understood that one or more modules could provide the same operation.

Additionally, computing system 750 includes communication interface 758 that can be configured to receive the data from computing system 710 using communication network 705.

Referring still to FIG. 7, processing system 756 can comprise a microprocessor and other circuitry that retrieves and executes software 752 from storage system 754. Processing system 756 can be implemented within a single processing device but can also be distributed across multiple processing devices or sub-systems that cooperate in executing program instructions. Examples of processing system 756 include general purpose central processing units, application specific processors, and logic devices, as well as any other type of processing device, combinations of processing devices, or variations thereof.

Storage system 754 can comprise any storage media readable by processing system 756, and capable of storing software 752 and data from computing system 710. Data from computing system 710 may be stored in a word, excel, or any other form of digital file. Storage system 754 can include volatile and nonvolatile, removable and non-removable media implemented in any method or technology for storage of information, such as computer readable instructions, data structures, program modules, or other data. Storage system 754 can be implemented as a single storage device but may also be implemented across multiple storage devices or sub-systems. Storage system 754 can comprise additional elements, such as a controller, capable of communicating with processing system 756.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

In some examples, computing system 750 could include a user interface. The user interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in the user interface. The aforementioned user input and output devices are well known in the art and need not be discussed at length here. It should be understood that although computing system 750 is shown as one system, the system can comprise one or more systems to store and manage received data.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

What is claimed is:

1. An information capturing and processing system, comprising:
    a mobile computing device for hair and beauty service configured to:
        receive user input data from a user at the mobile computing device;
        receive third-party data from individual service providers at the mobile computing device;
        create a list of available individual service providers that meet a set of selected requirements of a user at the mobile computing device, wherein the list of available individual service providers is based at least in part on the user input data and the third-party data;
        select a plan of service and an individual service provider by the user at the mobile computing device, wherein the selected plan of service and the selected individual service provider are chosen from the list of available individual service providers;
        transmit the selected plan of service to the selected individual service provider via a communication link;
        allow the user to execute the selected plan of service by engaging directly with the selected individual service provider;
        provide a review of the selected plan of service to the selected individual service provider by the user at the mobile computing device, wherein the user can provide the selected individual service provider with feedback related to the selected plan of service;
        receive a summary of the selected plan of service from the selected individual service provider after the selected service plan has been performed at the mobile computing device; and
        transmit the summary of the selected plan of service to a server via a communication link, wherein the summary of the selected plan of service can be accessed by the user and the selected individual service provider.

2. The information capturing and processing system of claim 1 wherein the mobile computing device is further configured to allow the user to change the selected plan of service before the selected plan of service is performed.

3. The information capturing and processing system of claim 1 wherein the mobile computing device is further configured to allow the user to create a user personal profile comprising one or more types of haircut.

4. The information capturing the processing system of claim 1 wherein the mobile computing device is further configured to allow the user to provide feedback to the selected plan of service performed and the feedback is provided to the selected individual service provider, the selected individual service provider is allowed to provide a response to the feedback.

5. The information capturing and processing system of claim 2 wherein the mobile computing device is further configured to allow the user's feedback and the selected individual service provider's response to be posted on one or more social media platforms.

6. A non-transitory storage medium with instructions stored thereon which, if executed by a processor, cause the processor to:
    receive user input data for hair and beauty services from a user at a mobile computing device;
    receive third-party data for hair and beauty services from individual service providers at the mobile computing device;
    create a list of available individual service providers that meet a set of selected requirements of a user at the mobile computing device, wherein the list of available individual service providers is based at least in part on the user input data and the third-party data;
    select a plan of service and an individual service provider by the user at the mobile computing device, wherein the selected plan of service and the selected individual service provider are chosen from the list of available individual service providers;
    transmit the selected plan of service to the selected individual service provider via a communication link;
    allow the user to execute the selected plan of service by engaging directly with the selected individual service provider;
    provide a review of the selected plan of service to the selected individual service provider by the user at the mobile computing device, wherein the user can provide the selected individual service provider with feedback related to the selected plan of service;
    receive a summary of the selected plan of service from the selected individual service provider after the selected service plan has been performed at the mobile computing device; and
    transmit the summary of the selected plan of service to a server via a communication link, wherein the summary of the selected plan of service can be accessed by the user and the selected individual service provider.

7. The non-transitory storage medium of claim 6, wherein the instructions, if executed by a processor, cause the processor to allow the user to change the selected plan of service before the selected plan of service is performed.

8. The non-transitory storage medium of claim 6, wherein the instructions, if executed by a processor, cause the processor to allow the user to create a user personal profile comprising one or more types of haircut.

9. The non-transitory storage medium of claim 6, wherein the instructions, if executed by a processor, cause the processor to allow the user to provide feedback to the selected plan of service performed and the feedback is provided to the selected individual service provider; the selected individual service provider is allowed to provide a response to the feedback.

10. The non-transitory storage medium of claim 9, wherein the instructions, if executed by a processor, cause the processor to allow the user's feedback and the selected individual service provider's response to be posted on one or more social media platforms.

\* \* \* \* \*